United States Patent [19]

Parker

[11] Patent Number: 5,499,686

[45] Date of Patent: Mar. 19, 1996

[54] DEEP TILLAGE WINGED SWEEP

[75] Inventor: Paul D. Parker, Ankeny, Iowa

[73] Assignee: Deere & Company, Moline, Ill.

[21] Appl. No.: 250,194

[22] Filed: May 26, 1994

[51] Int. Cl.⁶ ................................................ A01B 13/08
[52] U.S. Cl. .......................................... 172/730; 172/770
[58] Field of Search .................................... 172/721, 730, 172/770, 3

[56] References Cited

U.S. PATENT DOCUMENTS

| | | | |
|---|---|---|---|
| 255,058 | 3/1882 | Walden | 172/730 X |
| 670,017 | 3/1901 | Gilman et al. | 172/365 |
| 774,324 | 11/1904 | Hill et al. | 172/699 |
| 1,169,879 | 2/1916 | Smith et al. | 172/751 |
| 1,255,442 | 2/1918 | Lawford | 172/724 |
| 1,603,486 | 10/1926 | Mock | 172/722 |
| 1,982,746 | 12/1934 | Kovar | 172/724 |
| 2,034,229 | 3/1936 | Davis | 172/415 |
| 2,034,461 | 3/1936 | Daughtery | 172/731 |
| 2,692,544 | 10/1954 | Jessup | 172/730 X |
| 3,171,500 | 3/1965 | Dils, Jr. | 172/700 |
| 4,258,635 | 3/1981 | Lutz et al. | 172/730 X |
| 4,331,204 | 5/1982 | White | 172/70 |
| 4,408,667 | 10/1983 | Jarvis | 172/730 X |
| 4,457,381 | 7/1984 | Wetmore | 172/730 X |
| 4,538,689 | 9/1985 | Dietrich, Sr. | 172/700 |
| 5,259,461 | 11/1993 | Cochrane | 172/730 |
| 5,398,770 | 3/1995 | Harden | 172/730 X |

FOREIGN PATENT DOCUMENTS 1217682  5/1960  France .

OTHER PUBLICATIONS

DMI, Inc., DMI brochure entitled "Ecolo-Tiger", 2 pages, date unknown, published in the U.S.A.

*Primary Examiner*—Terry Lee Melius
*Assistant Examiner*—Christopher J. Novosad

[57] ABSTRACT

A long wearing deep tillage sweep includes a central point member having a leading tip and attached to a shank at an angle to the horizontal of approximately 30 degrees. A pair of wings having the shape of a parallelogram are fixed to the lower, forward portion of the point with the sides of the wings parallel to the forward direction of travel and with the leading and trailing edges extending outwardly from the member and parallel to the surface of the ground when the shank is in the normal field-working position. The top surface of the wings has a shallower angle than the point surface, which, together with the horizontal leading and trailing wing edges, reduces soil disturbance. The wings are closely adjacent the tip of the point member so that the angle of the resultant force on the sweep closely approximates that of a straight point alone and the depth of tillage is more consistent than tools having wings offset a greater distance from the leading tip. The leading portions of the wings are hardened, and the wings and point include upwardly and rearwardly directed rear walls which provide a self-sharpening effect as the leading edges wear.

17 Claims, 2 Drawing Sheets

DEEP TILLAGE WINGED SWEEP

BACKGROUND OF INVENTION

1) Field of Invention

The present invention relates generally to agricultural tillage tools, and, more specifically, to an improved sweep for deep tillage applications.

2) Related Art

Earthworking tools such as deep tillage and ripper shanks have for the most part used a straight, flat point to lift and shatter soil at depths of 10 inches (0.25 meters) or more. Straight points provide a limited shatter zone, and in recent years there has been an increasing desire by many farmers to create a wider shatter zone.

Winged points, such as the commercially available DMI Tiger-Point which is generally of the type shown and described in U.S. Pat. No. 4,538,689, include wings that slope downwardly and outwardly to create an energy demanding boiling effect by pushing soil forwardly and upwardly. Such action often brings up subsoil and leaves large clods on the surface so that additional tillage steps are required to break the clods into smaller pieces for a level surface which is necessary, for example, to provide a suitable seed bed for planting. The inclined wings produce some bulldozing effect and cause the resultant draft angle to be flatter (that is, closer to parallel with the ground) so that more horizontal force and therefore more tractor horsepower is required to move the tool through the ground. In addition, the flatter draft angle increases the moment arm tending to trip the standard, and a larger force is required to keep the shank in the ground. The increased moment requires heavier springs or links to maintain the working position of the standard. As the point wears and becomes blunt, further increase in the draft loads is experienced.

Another disadvantage of some winged point tools is the relatively large distance between the point and the wings which causes the resultant force on the tool to be offset from the resultant force of a straight point for which the standard was designed. Also, the wider tillage zone for the winged point does not start at the lower tip of the point, but is as much as several inches higher than the tip to avoid a plow sole. The large vertical offset between the point and the wings results in an inconsistent depth of tillage.

Recently, tests of draft angle on various tools has shown that the resultant draft angle on a conventional sweep is very similar to the straight, flat point. However, conventional sweeps are unacceptable for deep tillage and ripper shank applications at depths of 10 inches or more because the sweep wears too quickly.

BRIEF SUMMARY OF THE INVENTION

It is therefore an object of the present invention to provide an improved sweep for deep tillage operations. It is another object to provide such a sweep which overcomes most or all of the above-listed disadvantages.

It is a further object to provide an improved deep tillage sweep that has an increased shatter zone as compared to a flat point. It is still another object to provide such a sweep which has an improved resultant draft angle similar to that provided by a conventional sweep or a straight point.

It is another object to provide an improved deep tillage sweep that requires less tractor horsepower than at least most previously available winged deep tillage points. It is a further object to provide such a sweep that reduces energy demanding bulldozing and soil mixing action.

It is still a further object of the invention to provide an improved deep tillage sweep that produces less surface disturbance than at least most winged points and which leaves fewer clods on the surface so that the amount of tillage necessary to produce an acceptable seed bed is reduced.

It is a further object to provide an improved deep tillage sweep having a more consistent depth of tillage than at least most previously available winged point tools. It is another object to provide such a sweep wherein the resultant force on the sweep is relatively close to that for a simple straight point.

It is yet another object of the invention to provide a deep tillage sweep that closely simulates the tillage action of a conventional sweep while having a wear life that is substantially greater than that of the conventional sweep. It is still another object to provide such a sweep wears in such a way that a sharpened leading edge is maintained.

A deep tillage sweep constructed in accordance with the teachings of the present invention includes a central point member having a leading tip and attached to a shank at an angle to the horizontal of approximately 30 degrees. A pair of wings having the shape of a parallelogram are fixed to the lower, forward portion of the point with the sides of the wings parallel to the forward direction of travel and with the leading and trailing edges extending outwardly from the member and parallel to the surface of the ground when the shank is in the normal field-working position. The top surface of the wings has a shallower angle than the point surface, which, together with the horizontal leading and trailing edges, reduces soil mixing, lifts fewer clods, and lessen surface disturbance. The wings are closely adjacent the tip of the point member, in both the horizontal and vertical directions, so that the angle of the resultant force on the sweep closely approximates that of a straight point alone and the depth of tillage is more consistent than tools having wings offset a greater distance from the leading tip.

The leading portions of the wings are hardened and include upwardly and rearwardly directed rear walls which provide a self-sharpening effect as the leading edges wear. The rear wall of the point behind the tip is also angled for a self-sharpening effect. The relatively small offset of the leading edges of the wings relative to the point tip allows the point tip to wear independently of the wings without adversely affecting tillage depth consistency or resultant force angle.

DESCRIPTION OF THE PREFERRED EMBODIMENT

Figure 1:
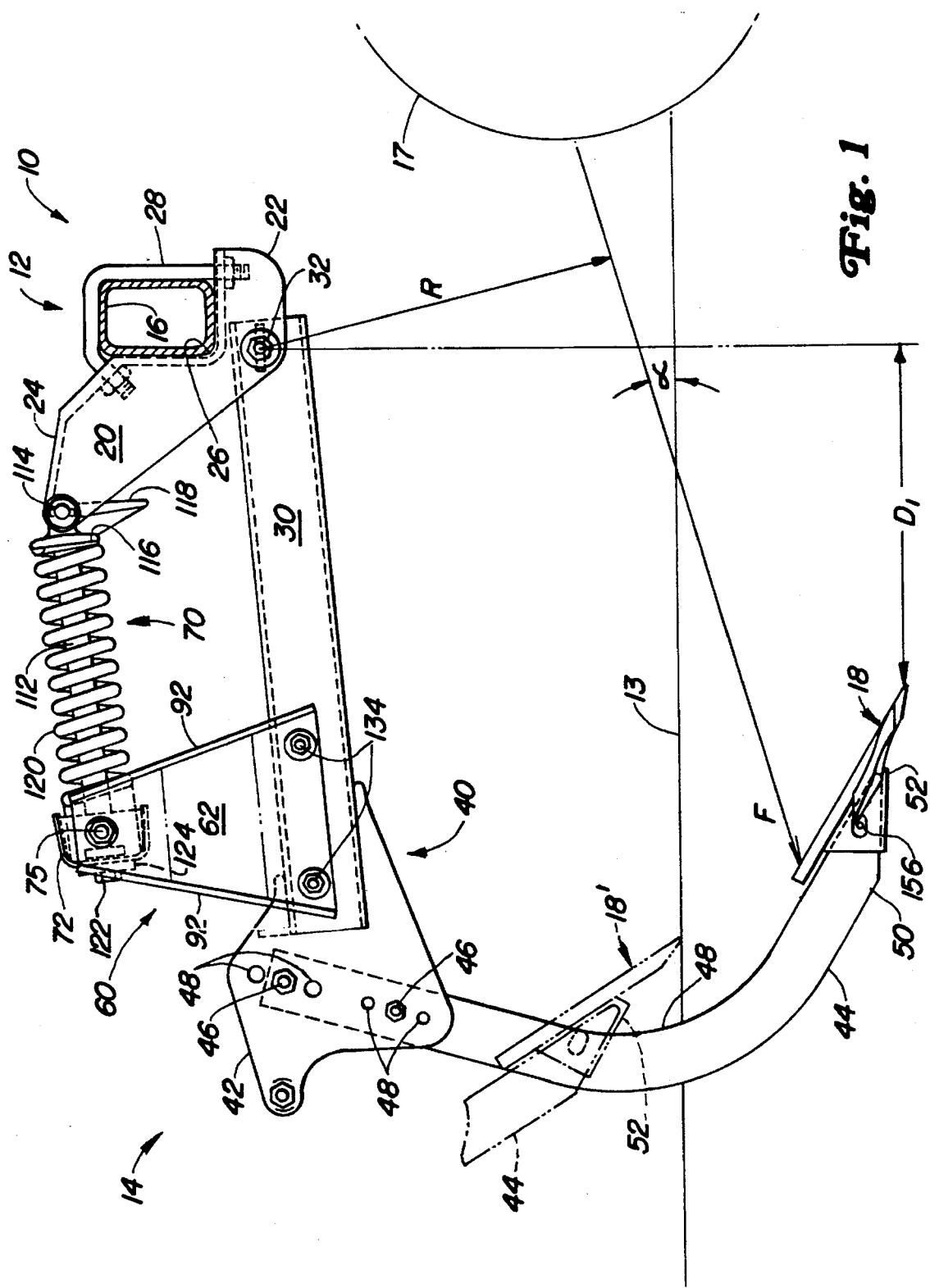
FIG. 1 is a side view of a spring trip standard assembly with a deep tillage sweep (solid lines) constructed in accordance with the present invention attached thereto, and showing the tripped position (broken lines) of the standard with a conventional straight point.

Referring to FIG. 1, therein is shown a portion of an implement 10 with a main frame 12 adapted to be towed forwardly over the surface 13 of the ground by a tractor or other towing vehicle (not shown). Preferably, the implement 10 is a disc tiller or similar tillage implement with a plurality of spring trip standard assemblies 14 spaced on one or more generally transverse beams 16 of the frame 12. Disc gangs 17 are located forwardly and rearwardly of the standard assemblies 14, and a winged point tool 18 is supported by the standard assembly (a conventional straight point 18' is shown in the tripped position by the broken lines of FIG. 1).

Detailed Description of the Spring Trip Standard

As seen in FIG. 1, the spring trip standard assembly 14 includes a mounting bracket 20 which is generally channel-shaped and includes a bottom portion 22 which opens downwardly and an upper, rear portion 24 which opens in the rearward direction. A right angled notch portion 26 abuts against the rear and bottom faces of the main frame beam 16 and is secured thereto by a double bolt assembly 28. A standard tube or drawbar 30 of rectangular cross section includes a forward end pivotally connected for rocking about a transverse axis to the bottom portion 22 of the bracket 20 by a pin and bushing assembly or pivot 32. Mounting structure 40 having a pair of transversely spaced plates 42 is welded to the aft end of the tube 30. An edge-bent shank 44 includes an upper apertured end secured by bolts 46 between the plates 42 of the structure 40. A series of spaced apertures 48 are provided in the mounting plate structure 40 and/or the upper end of the shank 44 for vertical adjustment of the shank. In the working position of the standard assembly shown in FIG. 1, the upper portion of the shank 44 extends generally in a straight line downwardly and slightly rearwardly to a center curved section 48 which terminates in a lower, forwardly projecting tool-supporting end 50.

The earth-working tool 18 includes mounting structure 52 for securing the tool to the end 50 so that the soil-working surface of the tool 18 has substantially upwardly and forwardly directed components. Preferably, the shape of the edge-bent shank 44 conforms to parabolic-shaped ripper standard which lifts and shatters soil. However, the shank 44 is secured to the mounting plate structure 40 such that maximum operating depth will be on the order of 13 inches rather than the deeper depths of the conventional ripper standard. Such intermediate depth operation results in large draft loads, with upper average draft loads in the range of 2000 pounds.

The assembly 14, which is drawn substantially to scale in FIG. 1 and which is the subject of my copending and commonly assigned application (Ser. No. 08/159,991 filed 30 Nov. 1993 and entitled "Deep Tillage Standard and Bracket Therefor"), includes a rear bracket assembly 60 having a pair of formed mounting plates or side members 62 bolted to the aft end of the tube 30 and extending upwardly and outwardly therefrom to pivot receiving ends 64. A double spring assembly 70 is pivotally connected to the upper end 24 of the mounting bracket 20 and extends rearwardly therefrom to a rear saddle bracket 72 pivotally connected to the upper ends 64 of the plates 62. The saddle bracket 72 is generally channel-shaped and opens in the forward direction. The sides of the saddle bracket 72 are closed and provide pivot mounting structure 75 for connecting the bracket 72 to the ends 64 for rocking about a transverse axis. The pivot structure 75 is offset a substantial distance above the tube 30 and supports the spring assembly 70 generally parallel to the tube when the standard is in the field-working position shown in the solid lines of FIG. 1. As the standard trips towards a maximum tripped position (broken lines), the angle of the spring assembly 70 with respect to the tube 30 changes along with the effective moment arm through which the spring force operates.

The double spring assembly 70 includes a pair of spring support or retaining structures 112 generally of the type shown and described in the U.S. Pat. No. 4,463,813. Each of the structures 112 includes a forward end 116 with an integral stop 118. The forward end 116 is pivotally connected to the upper end 24 of the mounting bracket 20 by a pivot pin assembly 114 located rearwardly of and above the pivot 32. A coil spring 120 is supported on each structure 112 and is compressed between the end 116 and the back wall of the saddle bracket 72. The two springs 120 can provide a total force of over 10,000 pounds and preferably a force as high as 11,700 pounds. The aft end of each structure 112 includes an internally threaded portion, and a bolt 122 is inserted through a washer 124 and an aperture in back side of the bracket 72. The bolt 122 is threaded into the aft end to compress the spring 120 between the bracket 72 and the forward end 116. The bolts 122 limit downward rocking of the shank 48 to the lowermost position shown in FIG. 1. If further details of the retaining structures 112 are desired, reference may be had to the aforementioned U.S. Pat. No 4,463,813.

To provide a hard joint between the bracket plates 62 and the tube 30, bushings which pass through and are welded to the tube 30 receive bolts 134. The bolts tightly secure the plates 62 against the opposite ends of the bushings.

The horizontal offset between the tool 18 and the pivot 32 (D1 of FIG. 1) is increased over conventional spring trip standards and, as shown in FIG. 1, is substantially greater than 15 inches and preferably approximately 18 inches. This relatively large offset D1 provides a lower effective moment arm (R) through which the resultant draft force (F) operates to urge the shank in the counterclockwise direction about the pivot 32. For the shank geometry shown in FIG. 1, a horizontal trip load of about 2300 pounds through the mounting hole of the tool 18 results in the same moment about the standard pivot 32 as a resultant draft force of over approximately 4100 pounds (with the resultant draft at an angle α of greater than 15 degrees—preferably about 17 degrees—and intersecting the shank about 6 inches above the point of the tool 18). Since the high value for average draft is around 2000 pounds for the type of standard and a conventional straight point (18' shown in the broken lines of FIG. 1) operating at about a 13 inch depth, the above design criteria allows peak forces of two times the average without tripping.

As the standard trips, the effective moment arm through which the force F acts to rotate the assembly about the pivot 32 decreases. The effective moment arm through which the springs 120 operate to rotate the assembly in the opposite direction about the pivot decreases as the spring force increases.

Detailed Description of the Deep Tillage Sweep

Figure 2:
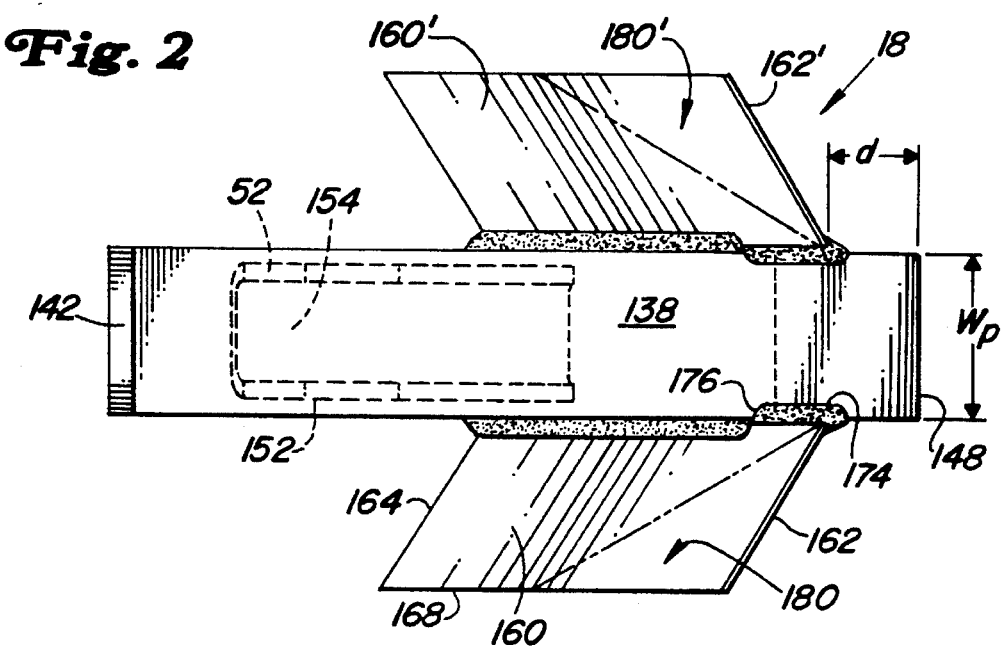
FIG. 2 is a top view of the deep tillage sweep of FIG. 1.
Figure 3:
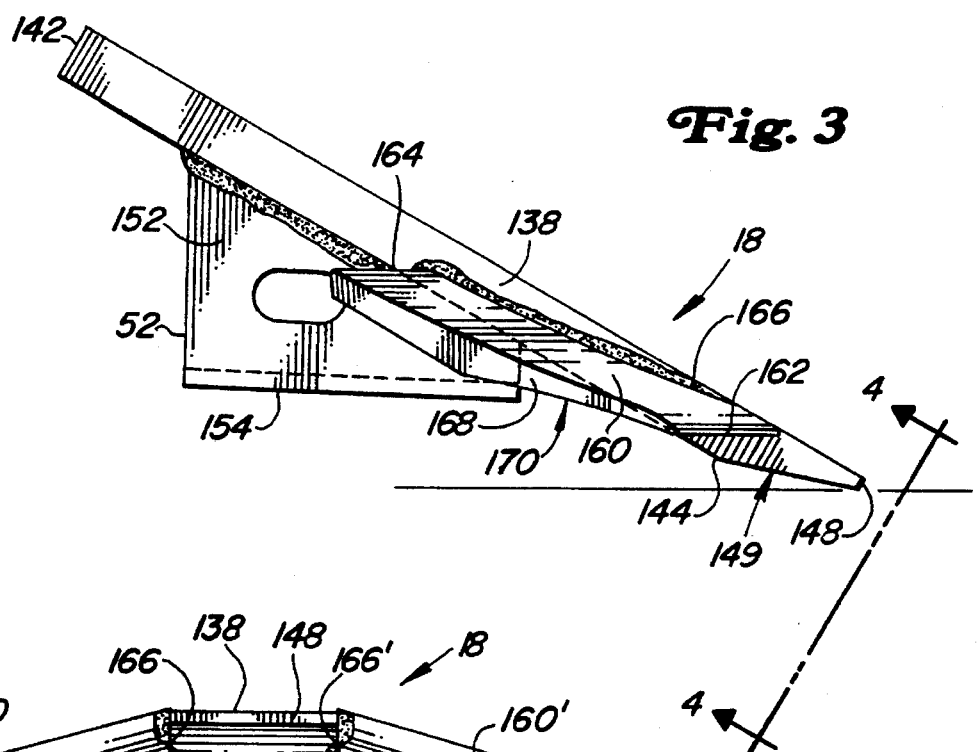
FIG. 3 is a side view of the sweep of FIG. 2.
Figure 4:
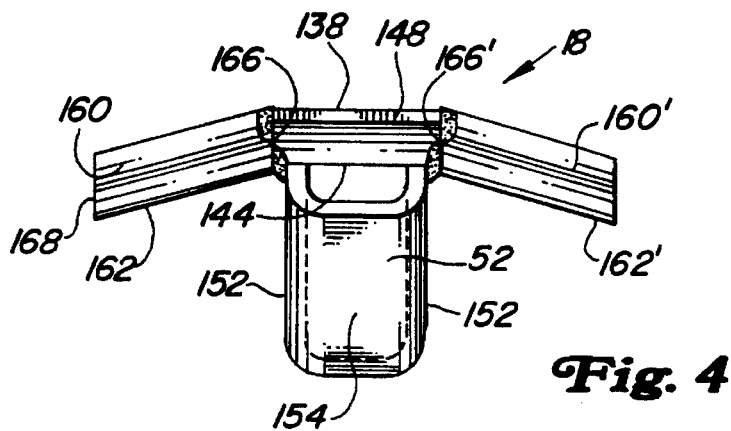
FIG. 4 is a view taken essentially along lines 4—4 of FIG. 3.

Referring now to FIGS. 2–4, the deep tillage sweep 18 of FIG. 1 will be described in detail below. The sweep 18, which is shown substantially to scale in the figures, includes a central point member 138 which is generally identical to the simple straight point (shown at 18' in FIG. 1) utilized, for example, with the commercially available John Deere model 900 V-Ripper. The point member 138 is formed from flat steel stock, and has a length of approximately 12 inches and a width of approximately 2.25 inches. The member 138 has a uniform rectangular cross section of thickness of about 0.75 inches extending from its rearward edge 142 downwardly and forwardly to a lower transition area 144 where the bottom of the member angles forwardly toward a forwardmost tip 148 for a decreasing vertical component of cross section. As best seen in FIG. 3, a bottom 149 of the member 138 from the transition area 144 to the tip 148 is flat and slopes upwardly in the rearward direction at an acute angle of preferably greater than about 10 degrees when the tool 18 is in the normal field-working position. This angled rear surface 149 provides a self-sharpening effect for the point tip 148 as the tip wears with use.

The top surface of the member 138 is planar and is supported from the shank 44 at an angle with the horizontal of less than about 35 degrees and preferably approximately 30 degrees by the mounting structure 52. The mounting structure 52 is generally in the form of an upwardly opening channel having slotted sidewalls 152 joined by a horizontally disposed bottom wall 154 offset rearwardly and above the transition area 144. The top edges of the sidewalls are parallel to the member 138 and are fixed to the bottom of the member 138 with the mounting structure opening rearwardly to receive the end 50 of the shank 44. The end 50 has a shape conforming generally to the shape of the interior portion of the mounting structure 52 and includes an aperture which aligns with the slots in the sidewalls 152. A pin 156 (FIG. 1) is inserted through the aperture and slots to retain the tool 18 on the shank 44.

Just above and rearwardly of the tip 148, outwardly projecting right-hand and left-hand wings 160 and 160' are connected to sides of the member 138. The wings are substantially mirror images of each other, and so only the right-hand wing 160 will be described in detail. Corresponding structure on the left-hand wing 160' is indicated by a prime. The wing 160 defines a leading edge 162 which extends horizontally less than approximately an inch above the tip 148 in the field-working position (solid lines of FIG. 1, and FIG. 3). As viewed from the top (FIG. 2), the wing 160 is generally in the shape of a parallelogram with a length parallel to the major axis of about 4.3 inches and a width along the minor axis of approximately 2.7 inches, so the wings have widths less than twice the point width. A trailing edge 164 extends parallel to the leading edge 162, with both the edges 162 and 164 parallel to the surface of the ground when the tool is in the field-working position for minimum surface disturbance. The edges 162 and 164 extend rearwardly to form an angle of about 64 degrees with respect to the fore-and-aft direction. The wing 160 includes an inside edge 166 which is fixed to the member 138 and an outside edge 168 which is offset from the inside edge a distance approximately equal to the width of the point member 138 so that the overall width of the sweep is approximately three times the width of the point member 138 only. Preferably, the wing 160 has a special cross section (FIG. 3) which is similar to the plow share cross section on commercially available John Deere plows to provide an upwardly and rearwardly angled back surface 170 for a self-sharpening effect as the leading edge 162 wears. The upper rear portion of the wing 160 has an increased thickness for good wing strength.

The wing 160 may be attached by any suitable method but preferably the inside edge 166 is welded to outside edge of the point member 138. The innermost portion of the leading edge 162 is aligned vertically with the top surface of the member 138, and the rear edge 164 of the wing is positioned substantially below the top surface so that the forward face of the wing has a shallower slope than the adjacent point member surface for reduced draft and less soil disturbance. The wing is welded along the inner edges 166 with the forward portion of the weld 174 extending onto the surface of the member 138. At a weld transition area 176 the weld extends rearwardly along the side of the member 138 and down around the back edge 164. During normal operation, the edges 162, 162' and 164, 164' extend generally parallel to the surface of the ground to minimize surface disturbance and soil mixing. The edges 162, 162' are supported slightly above (preferably 1 inch or less above) the lowermost portion of the tip 148 and behind the tip 148 a distance (d of FIG. 2) less than the width (Wp) of the point member 138. Preferably Wp is about 2.25 inches and the distance d is in a range of between 1 and 2 inches so that a uniform tillage depth is established. The forward offset of the tip 148 reduces wear on the wings 160, 160' by initially breaking the soil ahead of the wings. Also, with wear, the tip 148 tends to round off on the sides and starts to blend toward the weld 174 at the inner front edges 162, 162', and the forward offset d allows the point to wear independently of the wings. Increasing the distance d beyond about 2 inches has been found to provide no additional wear benefit.

As the tip 148 wears, the rear sloping surface 149 assures a relatively sharp point is maintained. The sloping rear surfaces 170 on forward portions of the wings provide a self-sharpening effect for the edges 162, 162'. The forward portions of the wings 162, 162' are hardened in the areas indicated generally at 180, 180', respectively, for increased wear resistance.

Having described the preferred embodiment, it will be apparent that modifications can be made without departing from the scope of the invention as set forth in the accompanying claims.

I claim:

1. In a deep tillage implement having a shank with a downwardly and forwardly directed tool-receiving end adapted for forward movement under the surface of the ground in a field-working position, a deep tillage sweep comprising:

a central point member having an upper surface sloping downwardly and forwardly to a lowermost and forwardmost point;

wings supported adjacent the point and having hardened leading edges extending in an outward direction from an inward location above and rearwardly of the point to thereby provide a widened tillage zone of soil shattered by the sweep as compared to a point tillage zone produced by the central point member alone;

mounting structure securing the sweep to the tool-receiving end with the point member at a depth of ten inches or more below the surface of the ground and with the leading edges extending parallel to the surface of the ground when the shank is in the field-working position to provide lifting action without a bulldozing effect for minimum soil disturbance on the surface of the ground; and wherein the leading edges are offset less than approximately one inch above said point so that the widened tillage zone is at approximately the same depth as a point tillage zone for a uniform depth of tillage.

2. The invention as set forth in claim 1 wherein the wings include trailing edges offset rearwardly from the leading edges, the trailing edges being substantially parallel to the leading edges.

3. The invention as set forth in claim 2 wherein each wing is in the shape of a parallelogram with innermost and outermost edges extending parallel to the forward direction.

4. The invention as set forth in claim 1 wherein the wings include trailing edges, the trailing edges also being parallel to the surface of the ground when the shank is in the field-working position.

5. The invention as set forth in claim 1 wherein leading edges adjacent the point member are offset less than two inches rearwardly from the point.

6. The invention as set forth in claim 5 wherein the point member has a width which is greater than the distance the leading edges are offset above the point.

7. The invention as set forth in claim 1 wherein the point member and the wing members each include rearwardly and upwardly sloping back sides to provide a self-sharpening effect as the point and leading edges wear.

8. In a deep tillage implement having a shank with a downwardly and forwardly directed tool-receiving end adapted for forward movement under the surface of the ground in a field-working position, a deep tillage sweep comprising:

a central point member having an upper surface sloping downwardly and forwardly to a lowermost and forwardmost point;

wings supported adjacent the point and having hardened leading edges extending in an outward direction from an inward location above and rearwardly of the point to thereby provide a widened tillage zone of soil shattered by the sweep as compared to a point tillage zone produced by the central point member alone;

mounting structure securing the sweep to the tool-receiving end with the leading edges extending parallel to the surface of the ground when the shank is in the field-working position to provide lifting action without a bulldozing effect for minimum soil disturbance on the surface of the ground;

wherein the leading edges are offset less than approximately one inch above said point so that the widened tillage zone is at approximately the same depth as a point tillage zone for a uniform depth of tillage and wherein the point member has a width which is greater than the distance the leading edges are offset above the point; and wherein the width of the point member is greater than the distance that the leading edges are offset rearwardly from the point.

9. In a deep tillage implement having a shank with a downwardly and forwardly directed tool-receiving end adapted for forward movement under the surface of the ground in a field-working position, a deep tillage sweep comprising:

a central point member having a preselected width and sloping downwardly and forwardly, the central point member including a lowermost and forwardmost point adapted for operating in the soil at depths of ten inches or more;

transversely extending wings having hardened forward portions supported from the point member rearwardly adjacent the point, the forward portions having leading edges extending in an outward direction from an inward location above and rearwardly of the point to thereby provide a widened tillage zone of soil shattered by the sweep as compared to a point tillage zone produced by the central point member alone, the leading edges extending outwardly from the inward location a distance which is less than about eight inches;

mounting structure securing the sweep to the tool-receiving end with the central point member sloping at an angle of less than approximately 35 degrees from the horizontal and with the leading edges extending parallel to the surface of the ground when the shank is in the field-working position to provide soil lifting action without a bulldozing effect for minimizing soil disturbance on the surface of the ground; and wherein the leading edges are offset less than about two inches behind the point so that the widened tillage zone is at approximately the same depth as the point tillage zone, thereby providing a relatively uniform depth of tillage and a resultant force closely approximating a resultant force for a point member without transversely extending wings.

10. The invention as set forth in claim 9 wherein the leading edges are supported above the point a distance less than approximately one inch so that resultant draft force on the sweep acts at approximately the same angle and position as a resultant draft force for the central point member alone.

11. The invention as set forth in claim 9 wherein the wings include trailing edges extending parallel to the surface of the ground when the shank is in the field-working position for minimizing surface disturbance.

12. The invention as set forth in claim 9 wherein the hardened forward portions include upwardly and rearwardly directed rear surfaces for providing a self-sharpening effect as the leading edges wear.

13. The invention as set forth in claim 9 wherein the point has a width greater than the vertical distance between the leading edges and the lowermost portion of the point when the shank is in the field-working position.

14. The invention as set forth in claim 9 wherein the point member has a planar top surface and the leading edges commence at a position generally level with the top surface of the point member.

15. The invention as set forth in claim 14 wherein the wings are welded to the point member with a portion of the weld connected the forwardmost portions of the wings extending onto the top surface.

16. The invention as set forth in claim 9 wherein the wings include upwardly directed surfaces generally forming an angle with a horizontal plane that is less than an angle formed by the planar top surface of the point member with the horizontal plane.

17. In a deep tillage implement having a shank with a downwardly and forwardly directed tool-receiving end adapted for forward movement under the surface of the ground in a field-working position, a deep tillage sweep comprising:

a central point member having a preselected width and sloping downwardly and forwardly, the central point member including a lowermost and forwardmost point;

transversely extending wings having hardened forward portions supported from the point member rearwardly adjacent the point, the forward portions having leading edges extending in an outward direction from an inward location above and rearwardly of the point to thereby provide a widened tillage zone of soil shattered by the sweep as compared to a point tillage zone produced by the central point member alone;

mounting structure securing the sweep to the tool-receiving end with the central point member sloping at an angle of less than approximately 35 degrees from the horizontal and with the leading edges extending parallel to the surface of the ground when the shank is in the field-working position to provide soil lifting action without a bulldozing effect for minimizing soil disturbance on the surface of the ground;

wherein the leading edges are offset less than about two inches behind the point so that the widened tillage zone is at approximately the same depth as the point tillage zone, thereby providing a relatively uniform depth of tillage wherein the point has a width greater than the vertical distance between the leading edges and the lowermost portion of the point when the shank is in the field-working position; and wherein the wings have widths less than twice the point width.

* * * * *